United States Patent
Peterson

[11] 3,989,487
[45] Nov. 2, 1976

[54] PACKAGED GAS STREAM HYDROCARBON DEWPOINT CONTROL APPARATUS

[75] Inventor: Adrian J. Peterson, Edmonton, Canada

[73] Assignee: Black, Sivalls & Bryson, Inc., Houston, Tex.

[22] Filed: Jan. 12, 1976

[21] Appl. No.: 648,102

[30] Foreign Application Priority Data
Oct. 9, 1975  Canada .................. 237318

[52] U.S. Cl. .................. 55/208; 55/32; 55/222; 55/267
[51] Int. Cl.² .................. B01D 19/00
[58] Field of Search .......... 55/31, 32, 38, 40, 42, 55/46, 48, 49, 50, 222, 385, 196, 208; 202/182, 183; 159/31

[56] References Cited
UNITED STATES PATENTS

| | | | |
|---|---|---|---|
| 1,957,624 | 5/1934 | Warner | 55/385 A |
| 2,428,643 | 10/1947 | Young | 55/32 |
| 2,812,827 | 11/1957 | Worley et al. | 55/32 |
| 3,100,385 | 8/1963 | Becker et al. | 55/267 |
| 3,182,434 | 5/1965 | Fryar | 55/32 |
| 3,451,897 | 6/1969 | Welch | 55/32 |
| 3,886,757 | 6/1975 | McClintock et al. | 55/31 |

Primary Examiner—Bernard Nozick
Attorney, Agent, or Firm—Laney, Dougherty, Hessin & Fish

[57] ABSTRACT

The present invention relates to packaged apparatus for controlling the hydrocarbon dewpoint of a gas stream particularly adapted for use in a cold environment. A weather-tight enclosure is provided which includes a liquid desiccant dehydration unit for dehydrating the gas stream and means for cooling the dehydrated gas stream whereby a residue gas stream having a desired hydrocarbon dewpoint is produced. Portions of the dehydration unit and means for cooling the gas stream extend outside the enclosure so that they are subjected to the cold environment and are cooled thereby and heat generated by the dehydration unit and means for cooling the gas stream is utilized to heat the interior of the enclosure.

4 Claims, 4 Drawing Figures

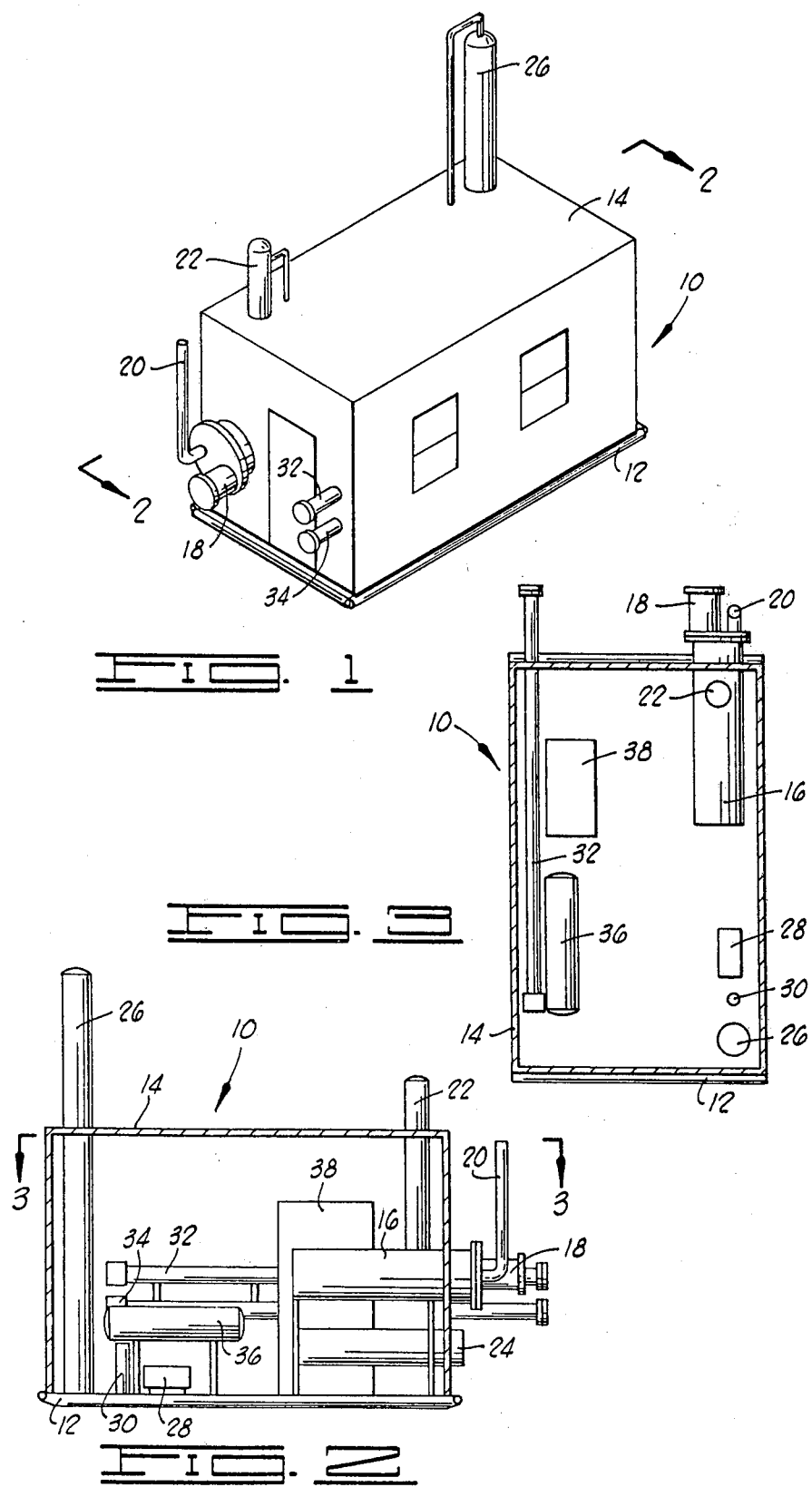

PACKAGED GAS STREAM HYDROCARBON DEWPOINT CONTROL APPARATUS

BACKGROUND OF THE INVENTION

1. Field of the Invention

The present invention relates generally to packaged apparatus for controlling the hydrocarbon dewpoint of a gas stream, and more particularly, but not by way of limitation, to preassembled apparatus for removing condensible components from a gas stream particularly adapted for use in cold environments.

2. Description of the Prior Art

Many various processes and apparatus have been developed and used for controlling the hydrocarbon dewpoint of a gas stream. Such processes and apparatus function to remove condensible hydrocarbon components from the gas stream so that such components are not present in the gas stream and therefore do not condense and accumulate in pipelines and other downstream gas processing apparatus. In areas of extremely cold wintertime environments such as Canada and Alaska, in order to transport hydrocarbon gas streams by pipeline from the location of production of the gas stream to a point of use or further processing, it is mandatory that the hydrocarbon dewpoint of the gas stream be controlled so that liquids are not condensed in the pipeline and associated processing equipment. The presence of condensed and accumulated liquids in gas transporting pipelines, separators and other associated equipment is detrimental in that severe damage to the equipment can occur.

While apparatus for dehydrating gas streams and removing condensible components therefrom by refrigeration have been used heretofore, such apparatus are generally elaborate and expensive to install and operate. By the present invention, packaged apparatus, i.e., skid mounted and preassembled apparatus, for controlling the hydrocarbon dewpoint of a gas stream is provided which is economical to install and operate and which takes economical advantage of the cold environment in which the apparatus is installed as well as the heat produced during operation of the apparatus.

SUMMARY OF THE INVENTION

The present invention is directed to packaged apparatus for controlling the hydrocarbon dewpoint of a gas stream. A weather-tight enclosure is provided and a vapor-liquid contact tower for dehydrating the gas stream by bringing about intimate contact between the gas stream and a stream of liquid desiccant having an affinity for water vapor is positioned with respect to the enclosure whereby the lower portion of the tower is disposed within the enclosure but the upper portion of the tower extends outside the enclosure. A liquid desiccant reconcentrator is provided which includes a reboiler having a gas burner attached thereto for heating liquid desiccant contained therewithin, a still column connected to the reboiler for reconcentrating the desiccant, and a reconcentrated desiccant surge vessel connected to the reboiler. The reconcentrator is positioned within the enclosure but is arranged with respect thereto so that the gas burner attached to the reboiler and the upper portion of the still column extend outside the enclosure. First conduit means are provided connected between the vapor-liquid contact tower and the liquid desiccant reconcentrator for conducting liquid desiccant therebetween in a closed circuit, and liquid desiccant pump means are disposed in the first conduit means positioned within the enclosure. Means for cooling the gas stream and separating condensed components therefrom are disposed within the enclosure for producing a residue gas stream having a desired hydrocarbon dewpoint. Second conduit means are provided connected between the vapor-liquid contact tower and the cooling and separating means for conducting the gas stream therebetween, and third conduit means are provided for conducting the residue gas stream from the cooling and separating means and from the enclosure.

It is, therefore, a general object of the present invention to provide a packaged gas stream hydrocarbon dewpoint control apparatus.

A further object of the present invention is the provision of apparatus for controlling the hydrocarbon dewpoint of a gas stream which is economical to install and operate.

Yet a further object of the present invention is the provision of preassembled apparatus for controlling the hydrocarbon dewpoint of a gas stream particularly adapted for use in cold environments.

Other and further objects, features and advantages of the invention will be readily apparent to those skilled in the art upon a reading of the description of preferred embodiments which follows when taken in conjunction with the accompanying drawings.

BRIEF DESCRIPTION OF THE DRAWINGS

FIG. 1 is a perspective view of the apparatus of the present invention.

FIG. 2 is a cross sectional view of the apparatus taken along line 2—2 of FIG. 1.

FIG. 3 is a cross sectional view of the apparatus taken along line 3—3 of FIG. 2.

DESCRIPTION OF PREFERRED EMBODIMENTS

Figure 4:
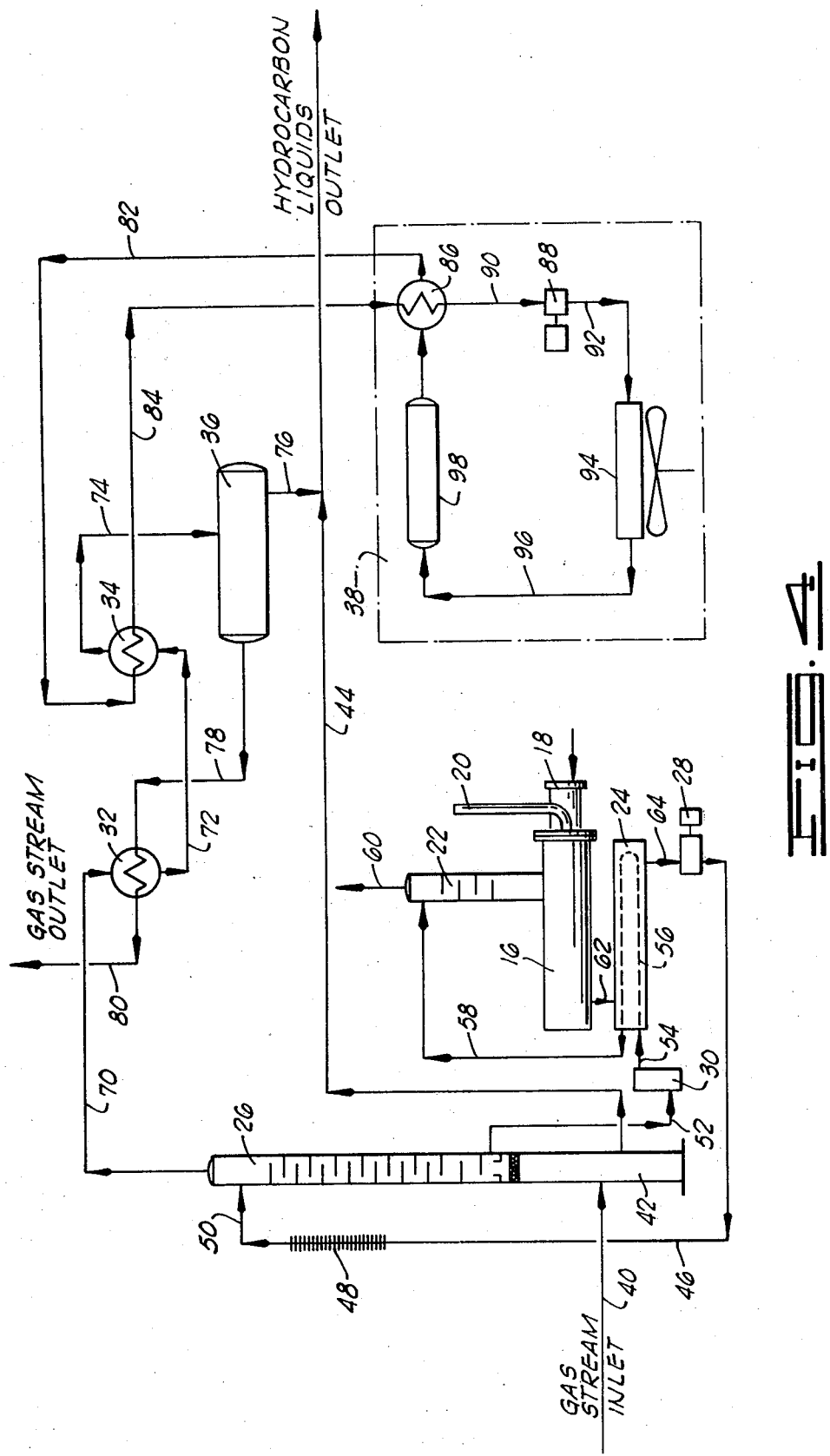
FIG. 4 is a diagrammatic illustration of the gas processing equipment which is a part of the apparatus of the present invention showing the flow of the various process streams therethrough.

Referring now to FIGS. 1 through 3, the packaged apparatus of the present invention is illustrated and generally designated by the numeral 10. The apparatus 10 includes a skid or base structure 12 having a weather-tight enclosure 14 attached thereto. The enclosure 14 can take a variety of shapes and designs, but preferably is rectangular in shape and includes a door and at least one window attached thereto.

Disposed within the enclosure 14 is a liquid desiccant gas stream dehydrator for removing water from the gas stream and cooling and separator means for cooling the dehydrated gas stream whereby condensible hydrocarbon components contained in the gas stream are condensed and removed therefrom. The dehydrator basically comprises a reboiler 16 having a fuel gas burner assembly 18 attached thereto for providing heat to a body of liquid desiccant contained within the reboiler 16. As is well understood by those skilled in the art, the burner assembly 18 is connected to a fire box disposed within the reboiler 16 which is in turn connected to a stack 20 whereby hot combustion gases produced by the burner assembly 18 flow through the fire box and are withdrawn therefrom by way of the stack 20. A still column 22 is connected to the top of the reboiler 16 in a conventional manner and a reconcentrated liquid desiccant surge vessel 24 is disposed below the reboiler 16. The reboiler 16, still column 22 and surge vessel 24 are disposed within the enclosure 14 in a manner whereby the end of the reboiler 16 including the burner assembly 18 and the stack 20 extends through an end wall of the enclosure 14 so that the burner and stack are outside the enclosure 14.

A vapor-liquid contact tower 26 is provided for bringing about intimate contact between the gas stream to be treated and a liquid desiccant having an affinity for water, e.g., an aqueous glycol solution. The tower 26 is positioned vertically with the lower portion thereof disposed within the enclosure 14 and the upper portion extending above and outside the enclosure 14. A liquid desiccant pump 28 and a liquid desiccant filter 30 are disposed within the enclosure 14 and conduits are provided which will be described in detail hereinbelow in connection with FIG. 4 connecting the gas stream to be processed to the tower 26 and the various components of the liquid desiccant reconcentrator together whereby a continuous stream of liquid desiccant is circulated into contact with the gas stream within the vapor-liquid contact tower 26.

Means for cooling the gas stream and separating condensed hydrocarbons components therefrom are disposed within the enclosure 14 for producing a residue gas stream having a desired hydrocarbon dewpoint. More specifically, and still referring to FIGS. 1 through 3, a gas-to-gas heat exchanger 32, a gas stream chiller 34 and a gas-liquid separator 36 are disposed within the enclosure 14 connected together and to the tower 26 by conduit means.

A refrigeration unit generally designated by the numeral 38 is disposed within the enclosure 14 connected by conduit means to the gas stream chiller 34. As will be understood, the refrigeration unit functions to continuously circulate a stream of refrigerant through the chiller 34 whereby heat is exchanged with the gas stream flowing therethrough cooling the gas stream. The heat exchanger 32 and chiller 34 are conventional shell and tube type heat exchangers positioned with respect to the enclosure 14 so that portions of the exchangers extend outside the enclosure 14.

Referring now to FIG. 4, the apparatus described above and the conduit means connected therebetween are illustrated in detail. The inlet gas stream to be processed is conducted to the vapor-liquid contact tower 26 by a conduit 40 connected thereto. The bottom portion of the tower 26 preferably includes an integral gas-liquid separator portion 42 so that liquids contained in the inlet gas stream are separated therefrom. A conduit 44 is connected to the separator portion 42 of the tower 26 for withdrawing liquids therefrom and conducting them from the enclosure 14 to a point of further processing or storage. The gas stream separated within the separator portion 42 of the tower 26 flows upwardly through conventional mist extracter and chimney tray internals into the upper portion thereof. The upper portion of the tower 26 is provided with means for bringing about intimate contact between liquid desiccant flowing downwardly therein and the gas stream flowing upwardly, e.g., vapor-liquid contact trays or packing material. As the gas stream flows upwardly through the tower 26 and is contacted by the liquid desiccant flowing downwardly therein water vapor is absorbed from the gas stream bringing about the dehydration thereof.

A stream of reconcentrated liquid desiccant flows by way of a conduit 46 to a heat exchanger 48 which functions to cool the liquid desiccant by exchange of heat with atmospheric air outside the enclosure 14. From the heat exchanger 48 the cooled reconcentrated liquid desiccant stream flows by way of a conduit 50 into the top portion of the tower 26 from where it flows downwardly into intimate contact with the gas stream flowing upwardly therein. The rich liquid desiccant produced in the tower 26, i.e., liquid desiccant containing absorbed water vapor, is withdrawn from the tower by way of a conduit 52 attached thereto. The conduit 52 leads a stream of the water-rich liquid desiccant to the filter 30 which functions to remove solid particles therefrom. From the filter 30, the water-rich liquid desiccant stream is conducted by a conduit 54 to a heat exchange coil 56 disposed within the surge vessel 24. As is well understood by those skilled in the art, the heat exchange coil 56 functions to bring about the exchange of heat from the hot reconcentrated liquid desiccant contained within the surge vessel 24 to the stream of relatively cool water-rich liquid desiccant thereby preheating the water-rich liquid desiccant. From the heat exchange coil 56, the stream of water-rich liquid desiccant is conducted by a conduit 58 to the top portion of the still column 22. The liquid desiccant flows downwardly within the still column 22 into intimate contact with hot water and desiccant vapors passing upwardly therewithin. Vapor-liquid contact trays or packing material are disposed within the still column 22 to insure intimate contact between the liquid desiccant stream and the rising vapors so that water vapor contained in the liquid desiccant stream is stripped and separated therefrom. The separated water vapor produced within the still column 22 is withdrawn therefrom by a conduit 60 connected to the top portion thereof. The reconcentrated liquid desiccant stream flows from the still column 22 into the reboiler 16 wherein heat is added thereto to bring about the reconcentration of liquid desiccant in the still column 22. Hot reconcentrated liquid desiccant flows from the reboiler 16 to the surge vessel 24 by way of a conduit 62 connected therebetween. The hot reconcentrated liquid desiccant is retained within the surge vessel 24 for a period of time sufficient to partially cool the liquid desiccant by exchange of heat with the stream of water-rich liquid desiccant flowing through the heat exchange coil 56. In addition, as described above, one end of the surge vessel 24 extends through a wall of the enclosure 14 whereby it is exposed to the cold environment outside the enclosure 14 thereby bringing about additional cooling of the reconcentrated liquid desiccant within the surge vessel 24. A stream of partially cooled reconcentrated liquid desiccant is withdrawn from the surge vessel 24 by way of a conduit 64 connected thereto which conducts the liquid desiccant to the suction connection of the liquid desiccant pump 28. The discharge connection of the pump 28 is connected to the conduit 46 so that a continuous stream of reconcentrated liquid desiccant is pumped through the conduit 46 to the heat exchanger 48 wherein it is further cooled and then into the vapor-liquid contact tower 26.

As will be understood, because the top portion of the still column 22 extends outside the enclosure 14, it is exposed to cold atmospheric air which cools it and facilitates good separation between water and liquid desiccant vapors generated within the still column 22. In addition, because the top portion of the vapor-liquid contact tower 26 is exposed to the cold environment outside the enclosure 14, it is cooled and the absorption of water vapor from the gas stream by the liquid desiccant stream is increased.

The dehydrated gas stream produced within the vapor-liquid contacter 26 is withdrawn therefrom by way of a conduit 70 attached thereto which conducts the gas stream to the shell side of the heat exchanger 32. The cooled residue gas stream produced in the separator 36 is conducted through the tube side of the heat exchanger 32 so that heat is transferred from the dehydrated gas stream to the residue gas stream thereby precooling the dehydrated gas stream. From the heat exchanger 32, the precooled dehydrated gas stream is connected by a conduit 72 to the shell side of the gas stream chiller 34. As the gas stream flows through the chiller 34 it is cooled by a refrigerant stream flowing on the tube side of the chiller 34 to a temperature level such that condensible hydrocarbon components contained in the gas stream are condensed. The resulting mixture of gas and condensed hydrocarbon liquids is withdrawn from the chiller 34 by way of a conduit 74 which conducts the mixture to the gas-liquid separator 36.

The condensed hydrocarbon components are separated from the gas stream within the separator 36 and withdrawn therefrom by way of a conduit 76 connected to the conduit 44. The temperature level of the gas stream flowing through the chiller 34 is controlled so that the residue gas stream produced in the separator 36 has a desired hydrocarbon dewpoint. The residue gas stream flows by way of a conduit 78 connected to the separator 36 to the tube side of the heat exchanger 32. From the heat exchanger 32, the resultant heated residue gas stream having a desired hydrocarbon dewpoint is conducted by a conduit 80 from the enclosure 14 to a pipeline for transporting the gas stream to a point of use or further processing.

As described above, portions of the heat exchanger 32 and chiller 34 extend outside the enclosure 14 so that the shell sides of the exchangers are subjected to the cold environment outside the enclosure 14 thereby facilitating the cooling of the gas stream flowing therethrough.

A compressed refrigerant stream flows from the refrigeration unit 38 by way of a conduit 82 to the tube side of the chiller 34. Conventional temperature controls are provided and an expansion valve (not shown) is disposed in the conduit 82 so that the refrigerant stream is vaporized as it flows through the chiller 34 thereby absorbing heat from the gas stream flowing on the shell side of the chiller 34. From the chiller 34 the vaporized refrigerant stream flows by way of a conduit 84 to the refrigerant unit 38. More specifically, the expanded and vaporized refrigerant stream flows through a heat exchanger 86 wherein it is partially cooled. The partially cooled refrigerant stream is conducted from the heat exchanger 86 to a compressor 88 by a conduit 90 connected therebetween. The compressor 88 functions to compress and pump the refrigerant stream through a conduit 92 connected to a forced air cooler 94. While flowing through the cooler 94, heat is exchanged between the compressed refrigerant stream and air so that the air is heated and the refrigerant stream is cooled and condensed. From the cooler 94 the condensed refrigerant stream flows by way of a conduit 96 to an accumulator 98 and from the accumulator 98 to the heat exchanger 86 by way of a conduit 99. The compressed refrigerant stream then flows by way of the conduit 82 back to the chiller 34.

The refrigeration unit 38 is disposed entirely within the enclosure 14 so that heat removed from the refrigerant stream by way of the air cooler 94 is discharged into the interior of the enclosure 14 thereby heating the interior of the enclosure. In addition, the heat radiated from the reboiler 16 and portions of the still column 22 and surge vessel 24 disposed within the enclosure 14 facilitate the heating of the interior thereof. A temperature controlled or manually operated louver can be disposed in a wall of the enclosure 14 so that a portion of the heated air produced by the air cooler 94 is discharged to the exterior of the enclosure 14 thereby preventing the interior from becoming overheated.

The refrigeration unit 38 is precharged with refrigerant and the other equipment making up the apparatus 10 is preassembled and tested so that the apparatus 10 is ready for operation when shipped to a location of use.

Thus, by the present invention, an improved package apparatus is provided for controlling the hydrocarbon dewpoint of a gas stream. Because the apparatus is skid mounted and preassembled, it is economical to install. Further, because the apparatus takes advantage of the cold environment outside the enclosure 14 to facilitate the dehydration and cooling of the gas stream as well as the reconcentration of the liquid desiccant stream, and utilizes the heat emitted by the liquid desiccant reconcentrator and refrigeration unit to heat the interior of the enclosure 14, the apparatus is economical to operate as compared to heretofore utilized apparatus. While presently preferred embodiments of the apparatus have been described for purposes of this disclosure, numerous changes in the arrangement, construction and design of the apparatus can be made by those skilled in the art, which changes are encompassed within the spirit of this invention as defined by the appended claims.

What is claimed is:

1. Packaged apparatus for controlling the hydrocarbon dewpoint of a gas stream adapted for use in cold environments comprising:

a weather-tight enclosure;

a vapor-liquid contact tower for dehydrating said gas stream by bringing about intimate contact between said gas stream and a liquid desiccant having an affinity for water vapor, said tower having a gas stream inlet connection and a dehydrated gas stream outlet connection and being positioned with respect to said enclosure whereby the lower portion of said tower is disposed within said enclosure and the upper portion of said tower extends outside said enclosure thereby exposing the upper portion of said tower to heat exchange with cold atmospheric air outside said enclosure;

a liquid desiccant reconcentrator including a reboiler having a gas burner attached thereto for providing heat to liquid desiccant contained therein, a still column connected to said reboiler, and a reconcentrated liquid desiccant surge vessel connected to said reboiler, said reconcentrator being positioned within said enclosure whereby heat liberated therefrom heats the interior of said enclosure with said gas burner attached to said reboiler and the upper portion of said still column extending outside said enclosure whereby the upper portion of said still column is exposed to heat exchange with cold atmospheric air outside said enclosure;

first conduit means connected between said vapor-liquid contact tower and said liquid desiccant reconcentrator for conducting liquid desiccant therebetween in a closed circuit;

pump means disposed in said first conduit means within said enclosure for circulating liquid desiccant between said vapor-liquid contact tower and said reconcentrator;

means for cooling said gas stream and separating condensed hydrocarbon components therefrom to thereby produce a residue gas stream having a desired hydrocarbon dewpoint, said means being disposed within said enclosure whereby heat liberated by said means heats the interior of said enclosure, and having a dehydrated gas stream inlet connection and a residue gas stream outlet connection;

second conduit means connected between said dehydrated gas stream outlet connection of said vapor-liquid contact tower and said dehydrated gas stream inlet connection of said means for cooling said gas stream and separating condensed components therefrom for conducting said gas stream therebetween;

third conduit means connected to said residue gas outlet connection of said means for cooling said gas stream and separating condensed components therefrom for conducting said residue gas stream to a pipeline; and a skid upon which said enclosure, said vapor-liquid contact tower, said liquid desiccant reconcentrator, said pump means, said means for cooling said gas stream and separating condensed components therefrom and said conduit means are mounted.

2. The apparatus of claim 1 wherein one end of said reconcentrated liquid desiccant surge vessel extends outside said enclosure whereby said vessel is exposed to heat exchange with cold atmospheric air outside said enclosure.

3. The apparatus of claim 2 which is further characterized to include heat exchange means disposed in said first conduit means outside of said enclosure for exchanging heat between reconcentrated liquid desiccant and atmospheric air.

4. The apparatus of claim 3 wherein said enclosure is a rectangular shaped building having a door and at least one window disposed therein.

* * * * *